United States Patent [19]
Despres

[11] Patent Number: 5,823,516
[45] Date of Patent: Oct. 20, 1998

[54] TORSION DAMPING DEVICE HAVING METALLIC SEATS FOR ITS SPRINGS, ESPECIALLY FOR A MOTOR VEHICLE

[75] Inventor: Dominique Despres, Amiens, France

[73] Assignee: Valeo, Paris, France

[21] Appl. No.: 623,820

[22] Filed: Mar. 29, 1996

[30] Foreign Application Priority Data

Mar. 31, 1995 [FR] France .................................. 95.03844

[51] Int. Cl.⁶ ............................................. F16D 3/12
[52] U.S. Cl. .......................... 267/168; 464/68; 192/106.2
[58] Field of Search .................. 267/290, 179, 267/168; 188/378, 379, 380; 464/64, 68; 192/106.2

[56] References Cited

U.S. PATENT DOCUMENTS

| | | | |
|---|---|---|---|
| 3,298,337 | 1/1967 | Thompso | 267/168 |
| 3,944,196 | 3/1976 | Schwartzopf | 267/168 |
| 4,950,205 | 8/1990 | Umeyama | 464/68 |

FOREIGN PATENT DOCUMENTS

| | | |
|---|---|---|
| 0258112 | 3/1988 | European Pat. Off. . |
| 0308178 | 3/1989 | European Pat. Off. . |
| 1328276 | 4/1963 | France . |
| 2599800 | 12/1987 | France . |
| 2627243 | 8/1989 | France . |
| 3832955 | 1/1989 | Germany . |
| 2179119 | 1/1987 | United Kingdom . |

*Primary Examiner*—Matthew C. Graham
*Attorney, Agent, or Firm*—Longacre & White

[57] ABSTRACT

A torsion damper is of the kind in which the springs bear against thrust inserts or spring seats. The anterior part of each spring seat has a circular perimeter, the diameter of which is smaller than the internal diameter of the outermost spring of the associated group of springs, while the posterior part of the spring seat includes a barrel element which projects from the back of the anterior part of the spring seat. This barrel element also extends radially beyond the perimeter of the anterior part, at each end of the barrel element, so that the outermost spring of the associated group bears on the projecting portions of the barrel element in end thrust engagement.

10 Claims, 2 Drawing Sheets

TORSION DAMPING DEVICE HAVING METALLIC SEATS FOR ITS SPRINGS, ESPECIALLY FOR A MOTOR VEHICLE

FIELD OF THE INVENTION

This invention relates to torsion damping devices, of the kind comprising two coaxial damper parts which are mounted for rotation of one with respect to the other against the action of springs which are interposed circumferentially between the said coaxial parts.

Such a torsion damping device is applicable, in particular, in the construction of a clutch friction wheel, in particular for a motor vehicle clutch, or in the construction of the inertia flywheel of a motor vehicle, otherwise commonly referred to as a double damped flywheel.

More particularly, the invention is directed to the case where a spring seat (which may also be called a thrust insert or thrust pad, for example) is inserted between, on the one hand, at least one of the ends of at least one of the springs, and on the other hand, one or other or both of the coaxial damper parts, the spring seat being interposed circumferentially between these latter and the associated spring or springs, with each spring seat comprising an anterior part and a posterior part, the anterior part being in end thrust engagement and/or centring engagement with at least one of the springs, with its posterior part itself bearing on at least one of the said coaxial parts of the torsion damping device.

BACKGROUND OF THE INVENTION

The thrust inserts, or spring seats, on which the springs thus bear may either be mounted for pivoting motion, i.e. so that they can rock in their seatings on the coaxial damper part or parts with which they engage, or they may be mounted in the latter in such a way that any rotary movement of this kind is prevented, in a way that may be called a blocked mounting.

The spring seats give the advantage of providing better seating for the springs, and in practice this seating is extended over the whole of a circumference. As a result, the springs are enabled to work under the best possible conditions.

In addition, the pivoting thrust inserts or spring seats also advantageously oppose the effects of centrifugal force on the springs. Finally, they may also, if desired, be arranged so that, to advantage, they serve to support nose elements of resilient material, which, working as full-torque abutments, thereby give the advantage of even distribution of the forces occurring within the springs before mutual engagement of the turns of adjacent springs occurs, in respect of at least some of the latter.

However, the spring seats do inevitably occupy some space due to their actual thickness, and this is detrimental to the amount of space available for accommodating the springs.

DISCUSSION OF THE INVENTION

An object of the present invention is to provide a torsion damping device, or torsion damper, in which this drawback is minimised where the springs are associated in groups of coaxial springs, having in common, at each end of the group of springs, a common spring seat, the axial cross section of which is stepped as a consequence.

According to the invention, a torsion damping device, of the kind comprising two coaxial parts which are mounted for rotation of one with respect to the other against the action of springs which are interposed circumferentially between them, is characterised in that, the springs being associated with each other in groups of coaxial springs, having in common, at each end of each said group, a spring seat the axial cross section of which is of stepped configuration, the anterior part of each spring seat has a circular perimeter the diameter of which is smaller than the internal diameter of the outermost spring of the associated group of springs, while the posterior part of each spring seat defines at the back of the anterior part a projecting element which, for abutment of the said outermost spring thereon, extends beyond the perimeter of the anterior part at each end of the projecting element.

Thus, the spring seats no longer provide the end thrust abutment for the outermost spring of the associated group of springs, except on the projecting end portions of the projecting element of their posterior part. However, this projecting element will in practice be engaged in a notch in one or both of the coaxial parts of the damper, and therefore does not take up, in the circumferential sense, any of the available space. This enables the length of the outermost spring of the associated group of springs to be increased.

In addition, the anterior part of each spring seat provides centring for the outermost spring of the associated group of springs, and, as is usual, resists the effects of centrifugal force on that spring. For the inner spring or springs of the group, the spring seat provides end thrust abutment and centring in the traditional way.

A compromise is thus found in a manner which is particularly simple and advantageous, between an increased circumferential length for the outermost spring of each group of springs, and a suitable seating for all of the springs.

The various features and advantages of the invention will appear more clearly on a reading of the following detailed description of preferred embodiments of the invention, which is given by way of non-limiting example only and with reference to the attached diagrammatic drawings.

DESCRIPTION OF PREFERRED EMBODIMENTS OF THE INVENTION

Figures 1, 2:
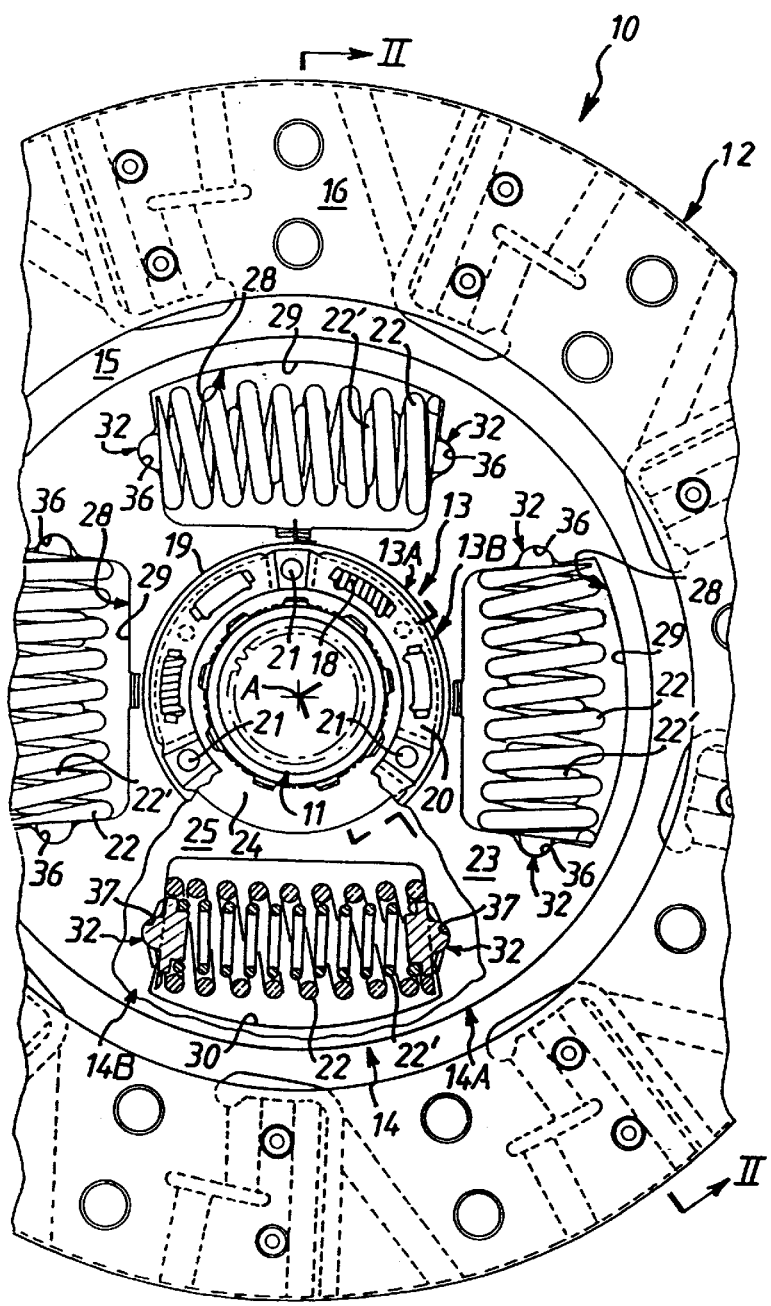
FIG. 1 is a view in elevation, shown partially cut away, of part of a torsion damping device, for one of the ends of possible travel in the angular displacement between the two coaxial parts of the torsion damping device.
FIG. 2 is a view in axial cross section of the same torsion damping device, taken on the line II—II in FIG. 1.

The drawings show by way of example the application of the invention to a clutch friction wheel 10, in particular for a motor vehicle clutch. The clutch friction wheel 10 comprises a hub 11 and a friction disc 12, with two torsion damping devices 13 and 14 which, in this example, are interposed in series between the hub 11 and the friction disc 12.

The friction disc 12 is adapted to be mounted on a driving shaft, for rotation with the latter. In practice this driving shaft is the engine shaft or crankshaft of the engine of the motor vehicle. The hub 11 is itself arranged to be mounted on a driven shaft for rotation with the latter. This driven shaft is in practice the input shaft of the gearbox.

The friction disc 12 comprises a thin annular plate 15 which may be divided into a plurality of blades, together with two friction liners 16, each of which is carried at the periphery of the annular plate 15, being arranged on either side of the latter so as to be gripped between the pressure plate and reaction plate (not shown) of the clutch.

The first torsion damping device 13 is a predamper in the present example, being arranged to work at low torques. It comprises two coaxial parts 13A and 13B, which are mounted for rotation of one with respect to the other against the action of springs 18, which are interposed circumferentially between the two coaxial parts 13A and 13B. One of the latter, in this example the coaxial part 13A, which consists of a simple, flat, annular ring 19, is mounted on the hub 11, in this example by seaming, so as to be rotatable with the hub 11. The other coaxial part, i.e. here the part 13B, consists in the present case of two guide rings 20 which flank the flat ring 19. The part 13B meshes with the torsion damping device 14, by means of spigots 21 in this example.

The torsion damping device 14 is the main torsion damper, and is arranged to work at high transmitted torques. The main torsion damper 14 also comprises two coaxial parts, 14A and 14B, which are mounted for rotation of one with respect to the other within the limits of a predetermined angular displacement and against the action of springs 22 and 22', which are interposed circumferentially between the two coaxial parts 14A and 14B.

In the present case the coaxial part 14A comprises two guide rings 23 which are mounted parallel to each other and spaced apart from each other. These guide rings 23 are fixed, at their inner periphery, to a support ring 24, through which they are in mesh, with a clearance, with the hub 11. The support ring 24 has for this purpose a set of internal teeth which mesh (with the same clearance) with an external set of teeth of the hub 11.

In this example the coaxial part 14B of the main damper includes a damper plate 25 which is interposed between the guide rings 23, being spaced from each of the latter. The damper plate 24 is mounted for free rotation around the support ring 24. The friction disc 12 is fixed to the damper plate 25 by means of rivets 26.

The springs 22 and 22', which are stiffer than the springs 18, are of the coil spring type. They are associated with each other in groups of coaxial springs. In FIGS. 1 to 6, each of these groups comprises two coaxial springs 22 and 22'. The outer spring 22 has a greater diameter and a greater stiffness than the inner spring 22'.

In the example shown, there are four of these groups of springs 22, 22', the groups being spaced apart at regular intervals on a circle. They are all disposed substantially tangentially to a common circumference of the assembly. Each group of springs 22, 22' is mounted in a housing 28, which is defined partly by a window 29 in the guide rings 23 of the coaxial part 14A, and partly by a window 30 in the damper plate 25 of the coaxial part 14B.

At each of their ends, the springs 22 and 22' of any one group has in common a spring seat (thrust insert, thrust pad) 32 which has an axial cross section defining one or more steps.

Figure 3:
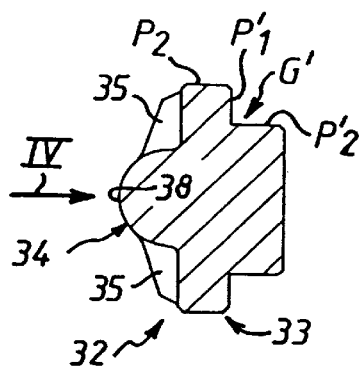
FIG. 3, which is derived from FIG. 1 but is on a larger scale, is a view of one of the thrust inserts or spring seats employed in this same torsion damping device, in transverse cross section taken on the line III—III in FIG. 4.

The anterior part 33 of this spring seat 32, that is to say the part of the latter which faces towards the springs 22 and 22' associated with it, has a circular perimeter, the diameter of which is smaller than the internal diameter of the associated outer spring 22, so that the anterior part 33 is totally engaged within the outer spring 22 and thereby serves only for the centring of that spring. The posterior part 34 of the spring seat 32, that is to say the part which faces towards the coaxial parts 14A and 14B of the main damper, consists of a projecting element projecting from the back of the anterior part 33, as is best seen in FIG. 3. This projecting element extends radially beyond the perimeter of the anterior part 33 at each end of the projecting element, so that the associated outer spring 22 is in end thrust engagement on these extensions.

Figure 4:
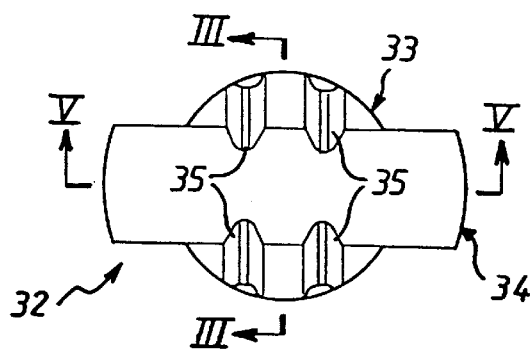
FIG. 4 is a view of the same spring seat in elevation, seen in the direction of the arrow IV in FIG. 3.
Figure 5:
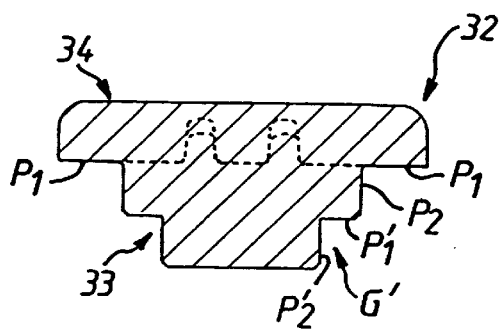
FIG. 5 is a view in longitudinal cross section taken on the line V—V in FIG. 4.

In this example, the projecting element constituting the posterior part 34 extends axially, that is to say it is parallel to the axis A of the coaxial parts 14A and 14B of the damper. The posterior part 34 follows substantially a diameter of the perimeter of the anterior part 33. At least one support rib 35, which extends transversely with respect to the axis of the posterior part 34, projects integrally from the back of the anterior part 33. In this example there are four of these ribs 35 disposed in pairs, facing towards each other and on either side of the posterior part 34. Each support rib 35 extends at least partly over the posterior part 34, and, at least locally, it matches the profile of the latter. In this example the ribs 35 do in fact extend over only part of the posterior part 34, so as to leave totally free, i.e. interrupted, the rear portion in the centre of the latter, as is best seen in FIG. 4, for the purposes of the pivoting mounting which will be explained later herein.

In FIGS. 1 to 6, the anterior part 33 has only one step G', defining a transverse shoulder $P'_1$ for end thrust engagement by the associated inner spring 22', together with a cylindrical axial surface $P'_2$ for centring this spring 22'. In addition, the anterior part 33 has an axial cylindrical surface $P_2$ at its outer periphery, for centring the associated outer spring 22, although, as has been mentioned, the end thrust engagement of this outer spring 22 is made on the posterior part 34, and more precisely on the projecting end portions $P_1$ of the latter (see FIG. 5).

All the spring seats 32 are identical to each other, and preferably each one is made in one piece, of metal.

In the rest or relaxed position, the spring seats 32 are engaged through their posterior parts 34 in substantially complementary notches 36 which are formed for this purpose on the radial edges of the windows 29 of the guide rings 23 of the coaxial part 14A of the torsion damper, and in further substantially complementary notches 37 which are formed correspondingly on the radial edges of the windows 30 of the damper plate 25 of the coaxial part 14B.

In FIGS. 1 to 6 the spring seats 32 are arranged for pivoting movement with respect to at least one of the coaxial parts 14A and 14B, about an axis parallel to the axis A of the latter. For this purpose, the posterior part 34 of each spring seat has a cylindrical surface 38 having a curved transverse cross section, formed at least locally on the back of the posterior part of the spring seat, that is to say on its rear portion. The notches 37 and 36 in the coaxial parts 14A and 14B have a generally curved profile of the same type. In the present case, the transverse cross section of the cylindrical surface 38 of each spring seat 32 is circular, and it extends substantially over a semicircle.

Figure 6:
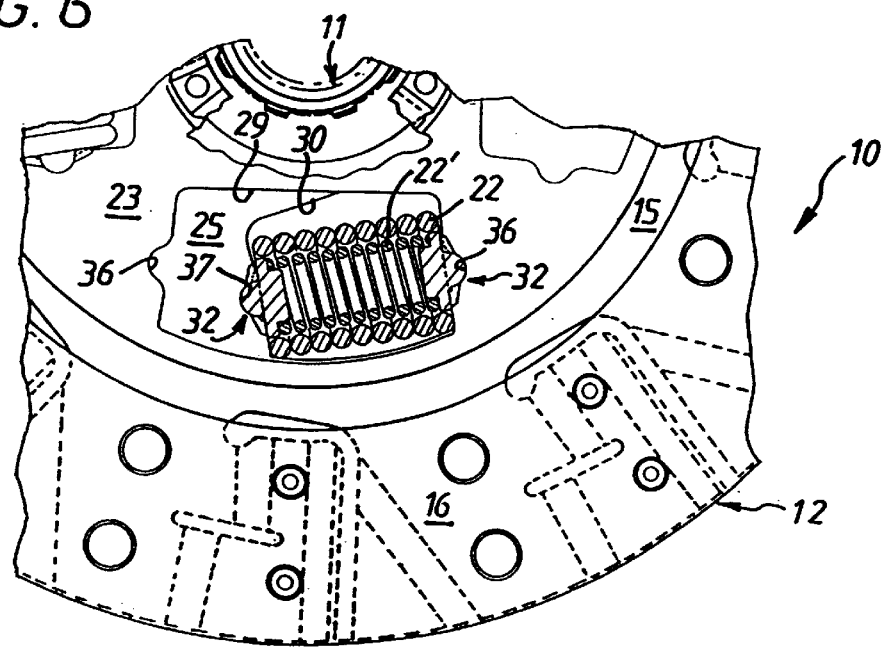
FIG. 6 is a scrap view in elevation which repeats part of FIG. 1, but which corresponds to the other end of the possible travel in the said angular displacement.

Preferably, at one of the ends of travel in the angular displacement between the two coaxial parts 14A and 14B, i.e. in the position shown in FIG. 1, the spring seats 32 mounted at the opposite ends of any one pair of springs 22, 22' are generally inclined with respect to each other in a first direction, so that one spring seat is divergent with respect to the other, as shown, from the axis A of the coaxial parts 14A and 14B at the periphery of these latter. At the other end of the travel in this angular displacement, as shown in FIG. 6, the two spring seats are generally inclined one with respect to the other, in a second direction. This second direction is opposite to the first direction mentioned above, so that, as shown, one spring seat is now convergent towards the other, from the axis A at the periphery of the coaxial parts 14A and 14B.

For this purpose, the radial edges of the windows 29 and 30 are made in a dihedral form, i.e. the radially outer portion of each of these edges is inclined with respect to the radially inner portion of the same edge lying on the other side of the associated notch 36 or 37.

In the rest position shown in FIG. 1, the spring seats 32 are in engagement through their anterior parts 33 on the radially inner portions of the corresponding radial edges, while there is a clearance between them and the radially outer portions of the same radial edges.

The reverse situation applies in the FIG. 6 position, i.e. at the end of the angular displacement between the coaxial parts 14A and 14B. Here, the spring seats 32 are in engagement through their anterior parts 33 on the radially outer portions of the radial edges of the windows 29 and 30, while there is a clearance between them and the radially inner portions of those edges.

Thus, in service the spring seats depart slightly, but never very far, from parallelism between them, and the working conditions of the springs 22 and 22' are thereby optimised to advantage.

In this example friction means are also provided between the coaxial damper parts 14A and 14B, so as to obtain some measure of hysteresis. In the present case these friction means comprise a friction ring 40, interposed axially between one of the guide rings 23 of the coaxial part 14A and the damper plate 25 of the coaxial part 14B. An axially acting resilient ring 42 is interposed between the damper plate 25 and the other guide ring 23. The result of these arrangements is that the friction ring 40 is gripped axially.

In the present example, a ring 43, which may also serve as a friction ring, is interposed between the resilient ring 42 and the damper plate 25. This ring 43 is mounted on the guide ring 23 by means of lugs, for rotation with the guide ring 23 on which the resilient ring 42 engages.

In this example the torsion damping device 13 is disposed laterally outside the torsion damping device 14, against a guide ring 23 of the coaxial part 14A of the latter, while the spigots 21 with which the coaxial part 13B is secured are in engagement with holes 45 formed for this purpose in that guide ring 23.

Figure 7:
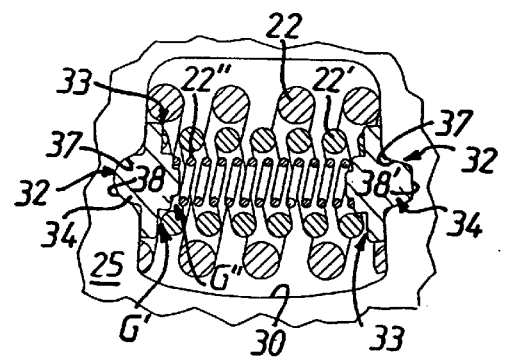
FIG. 7 is a further scrap view in elevation, again repeating part of FIG. 1, but relating to a modified embodiment of the invention.

Referring now to the modified embodiment in FIG. 7, each group of springs here comprises three coaxial springs 22, 22' and 22". The anterior part 33 of each spring seat 32 therefore has two steps, namely a step G' for the spring 22' and a further step G" for the spring 22".

In addition, FIG. 7 shows a blocked mounting of the spring seats 32 on the coaxial parts 14A and 14B of the damper, such that in this case the spring seats are prevented from pivoting with respect to the latter. This blocked mounting may take two forms, shown here, for illustrative purposes, in relation to the spring seats on the left hand side and right hand side of FIG. 7 respectively.

On the left hand side, the posterior part 34 of the spring seat again has a cylindrical surface 38 of circular transverse cross section formed at least locally on its back. However, it is so constructed that the anterior part 33 of this spring seat bears permanently on either one or other or both of the portions of the radial edges of the windows 29 and 30 of the coaxial parts 14A and 14B. These edges are substantially radial in this embodiment, instead of having a dihedral profile.

In the arrangement shown on the right hand side of FIG. 7, the posterior part 34 of the spring seat has a surface 38' with a polygonal transverse cross section formed at least locally on its back.

As before, notches 36 and 37 are provided in the coaxial parts 14A and 14B, but in this case they have a complementary polygonal profile.

As will have been understood from the foregoing, the ribs 35 of the spring seats 32 are inserted axially between the damper plate 25 and the guide rings 23, so as to locate the spring seats 32 axially, thereby preventing the latter from escaping into the housings 28 which contain the springs 22 and 22'. In this connection the guide rings 23 have, in this example, no retaining lip along the circumferential edges of their windows 29. However, where such retaining lips are provided for retention of the springs 22, the support ribs 35 can be dispensed with.

The present invention is not limited to the embodiments described above and shown in the drawings, but embraces all practical modifications and/combinations of the various elements. In particular, the spring seats 32 may be made of suitable synthetic material, for example polyamide of type 6.6.

In another modification, the anterior part 33 of each spring seat 32 may be of a synthetic material, with its posterior part 34 being of metal, the anterior and posterior parts being appropriately fixed to each other. For example, the posterior part 34 which is in the form of a projecting element may be snap-fitted on to the anterior part 33. In a further modified version the anterior and posterior parts of the spring seat may be secured together by adhesive bonding, or by moulding of the anterior part directly on to the posterior part.

It is possible to reverse the structures, with the damper plate 25 meshing, with a clearance, by virtue of a set of internal teeth, with a set of external teeth of the hub 11. The guide rings 23 will then be mounted for free rotation with respect to the hub 11, the guide rings 23 being connected together and fixed to the friction disc 12. The friction disc 12 is accordingly fixed, for example by riveting, to one of the guide rings. In this case, the torsion damping device 13, or predamper, is mounted axially between one of the guide rings 23 and the damper plate 25. It can in fact be omitted in some cases.

Finally, as has already been mentioned, the spring seats 32 may serve to support stop blocks of suitable elastic material, constituting end stop abutments for the springs 22 and 22'.

What is claimed is:

1. A torsion damper comprising two coaxial damper parts, springs interposed circumferentially between the said coaxial damper parts, and means mounting the two coaxial damper parts for rotation of one with respect to the other in angular displacement against the action of the said springs, wherein the said springs are arranged in groups, with each group consisting of a plurality of springs arranged coaxially one within another so that each said group of springs comprises an outer spring and at least one inner spring, the torsion damping device further including a plurality of spring seats, with each said group of springs having one said spring seat at each of its ends in common engagement with the springs of the group, each spring seat having an axial cross section defining at least one step, and each spring seat further comprising an anterior part and a posterior part, the anterior part defining a circular perimeter having a diameter smaller than the internal diameter of the said outer spring of the associated group of springs, the anterior part having a back facing away from the said associated springs, with the posterior part having a back defining a projecting element which extends radially beyond the perimeter of the anterior part at each end of the projecting element, for end thrust engagement thereon by said outer spring of the associated group of springs wherein the posterior part of each said spring seat lies along a diameter of the perimeter of the anterior part, and the posterior part of each spring seat defines an axis thereof, with its anterior part having in its back at least one integral rib extending transversely to said axis.

2. A torsion damping device according to claim 1 wherein said at least one rib is disposed on the posterior part, and follows, at least locally, a profile of the latter.

3. A torsion damping device according to claim 1 wherein said at least one rib extends only over a portion of the posterior part, leaving the rear portion of the latter totally uninterrupted.

4. A torsion damping device according to claim 1, wherein each spring seat has four said ribs disposed in pairs in facing relationship to each other and on either side of the posterior part of the spring seat.

5. A torsion damping device according to claim 1, wherein said projecting element defines a semi-cylindrical surface having a curved transverse cross section, formed at least locally in the back of the posterior part of the spring seat, said cylindrical surface defining a pivot axis parallel to the axis of said coaxial parts of the damper, each spring seat being mounted pivotally on at least one of the said coaxial damper parts by engagement of said semi-cylindrical surface with the latter, whereby to be pivotable about the said pivot axis.

6. A torsion damping device according to claim 1, in which the means mounting said coaxial parts of the damper, for said relative angular displacement of one with respect to the other, define a first end of travel and a second end of travel for the said angular displacement, wherein the spring seats at the ends of each said group of springs are so disposed as to be generally inclined with respect to each other in a first direction at the first end of travel, and in a second direction, opposed to said first direction, at the second end of travel.

7. A torsion damper according to claim 1, wherein the posterior part of each said spring seat defines a surface of polygonal transverse cross section at least locally in the back of the posterior part of the spring seat, whereby to mount the spring seat on at least one of said coaxial parts of the damper and to prevent relative titling of the spring seat with respect to the latter.

8. A torsion damper according to claim 1, wherein each spring seat is made of metal, in one piece.

9. A torsion damper according to claim 1, wherein each spring seat is made in one piece of a synthetic material.

10. A torsion damper according to claim 1, wherein the anterior part of each spring seat is of synthetic material and its posterior part is of metal, said anterior and posterior parts being attached to each other.

* * * * *